(No Model.)
G. F. CARLIE.
BICYCLE BELL.
No. 577,718. Patented Feb. 23, 1897.
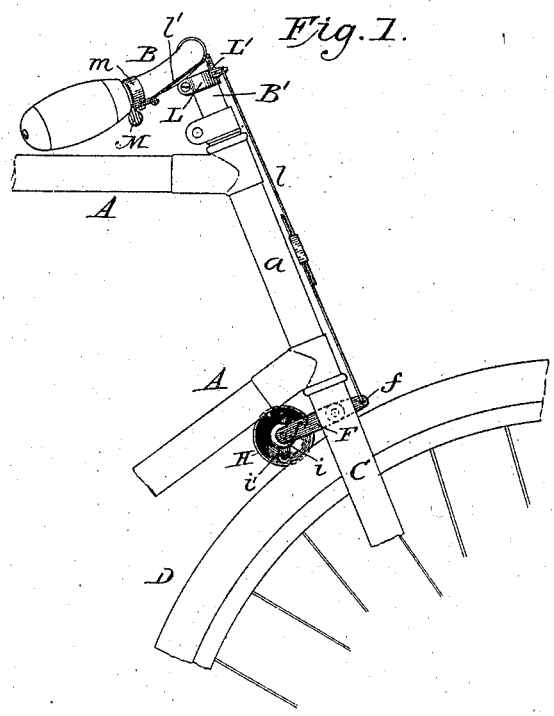
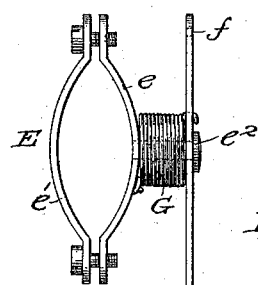
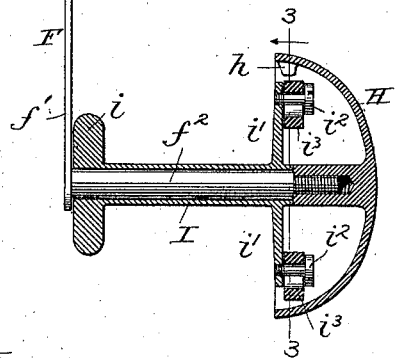
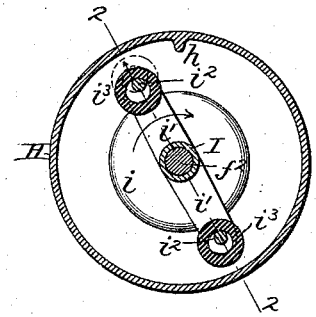
Witnesses:
Sidney P. Hollingsworth
Arthur Garner
Inventor:
George F. Carlie
by G. H. W. T. Howard
Attys.

UNITED STATES PATENT OFFICE.

GEORGE F. CARLIE, OF NEW YORK, N. Y.

BICYCLE-BELL.

SPECIFICATION forming part of Letters Patent No. 577,718, dated February 23, 1897.

Application filed May 26, 1896. Serial No. 593,105. (No model.)

*To all whom it may concern:*

Be it known that I, GEORGE F. CARLIE, a citizen of the United States, residing in the city of New York, in the county of New York and State of New York, have invented certain new and useful Improvements in Bicycle-Bells, of which the following is a specification, reference being had to the accompanying drawings and to the letters of reference marked thereon.

This invention relates to bells for bicycles and like vehicles, the object being to secure to the frame of the vehicle a bell normally silent, but which may be sounded by mechanism combined therewith when moved into engagement with one of the vehicle-wheels by a thumb-lever pivoted to the handle-bar near one of the handles or grips.

I have shown my invention as applied to a bicycle, but it may be used in connection with tricycles, quadricycles, or other similar vehicles.

In the accompanying drawings, Figure 1 is a side elevation of the forward portion of a bicycle with my invention attached thereto. Fig. 2 is a cross-section on the line 2 2, and Fig. 3 is a section on the line 3 3 of Fig. 2.

A is a portion of the main frame of a bicycle, consisting of two reach-bars and a steering-head $a$. Through the steering-head passes a spindle, (not shown,) to the upper end of which is adjustably secured the upright tube B' of the handle-bar B. The lower end of the spindle is rigidly secured to the fork C, carrying the front wheel D. The above parts are common to all bicycles and need no further description.

To one leg of the fork C, at a point preferably above the periphery of the wheel D, is affixed a clamp E, consisting of plates $e$ $e'$, curved so as to closely embrace the fork-leg, the clamp being secured thereto by screws passing through straight portions of the plates, which extend beyond the edges of the fork-leg. Projecting inwardly from the clamp E is a pin or stud $e^2$, on which is pivoted a vertically-vibrating lever F, the short arm of which extends slightly beyond the front of the fork and is perforated, as at $f$. The long arm $f'$ of the lever F, which projects rearwardly beyond the fork, has a long pin $f^2$, rigidly secured thereto, extending across the wheel D. A bell H, secured to the outer end of the pin $f^2$, has a projection $h$ on its inner surface near the edge.

A sleeve I, turning freely on the pin $f^2$ between the arm F and the bell H, carries at one end, near the arm, a roller $i$, while from the other end two arms $i'$ extend in opposite directions at right angles thereto. The arms $i'$ are of such length as to rotate freely within the edge of the bell. Headed pins $i^2$, secured to the ends of the arms $i'$, project within the bell and carry disks or weights $i^3$, the perforation therein, through which the pins $i^2$ pass, being of a diameter greater than that of the pins. A coil-spring G surrounds the stud $e^2$, one end of which is secured to the clamp E and the other end to the lever F, the tendency of the spring being to keep the bell away from the wheel D.

A clamp L, secured to the tube B' of the handle-bar, has pivoted thereto an elbow-lever L', from one arm of which a connecting rod or wire $l$ extends downwardly to the perforation $f$ in the lever F, where it is pivotally secured. From the other arm of the elbow-lever a wire $l'$ extends to a thumb-lever M, pivoted to a clamp $m$, secured to the handle-bar near one of the grips.

The device being in the position shown in Fig. 1, in which the bell is silent and the roller $i$ away from the wheel, if it is desired to ring the bell the rider presses the thumb-lever M, which through the rods $l$ $l'$ and elbow-lever L' rocks the lever F, thereby depressing the rear end, on which are carried the bell H and roller $i$ until the said roller strikes the periphery of the wheel D. The frictional contact between the wheel D and the roller will cause the latter, the sleeve I, to which it is secured, and the arms $i'$ on the sleeve to revolve with great rapidity. The weights $i^3$ on the ends of the arms $i'$, owing to the centrifugal force generated by the rapid rotation, will fly outward as far as the pins $i^2$ will permit. This will bring them in line with the projection $h$ on the bell, which they will strike and then pass, the large perforations in the disks permitting this action. When the thumb-lever is released, the parts return to the normal position.

Having thus described my invention, I claim—

In an alarm-bell for bicycles and like vehicles, a clamp adapted to be secured to the fork and having a pin or stud, a coiled spring surrounding said stud, one end of the spring being fastened to said clamp, a lever of the first order mounted upon said stud and adapted to rock thereon, and having attached to it the other end of said spring, and a pin or spindle carried by one arm of said lever, combined with a bell or gong fixed upon said pin and provided with an inner projection, a sleeve revolubly mounted upon said pin or spindle and having arms with pins extending therefrom, a disk or weight loosely mounted upon each of said pins, a roller fixed to said sleeve, and means, within the control of the rider, and connected with the end of the lever opposite to that carrying the bell, for depressing (against the normal action of said spring) the end of the lever carrying the bell, so as to bring the sleeve-roller in contact with the tire of a wheel of the vehicle, and thus, by frictional contact of said roller and tire, cause the rotation of said arms and the throwing out of the disks or weights by centrifugal force, whereby, in their revolutions, they shall strike the said projection, and thus sound the bell or gong, substantially as set forth.

In testimony whereof I hereunto set my hand and affix my seal this 9th day of May, 1896.

GEORGE F. CARLIE. [L. S.]

Witnesses:
JAMES A. STEWART,
BERNARD J. CORCORAN.